No. 829,987. PATENTED SEPT. 4, 1906.
A. MILLS.
STEERING GEAR.
APPLICATION FILED OCT. 13, 1905.
2 SHEETS—SHEET 1.
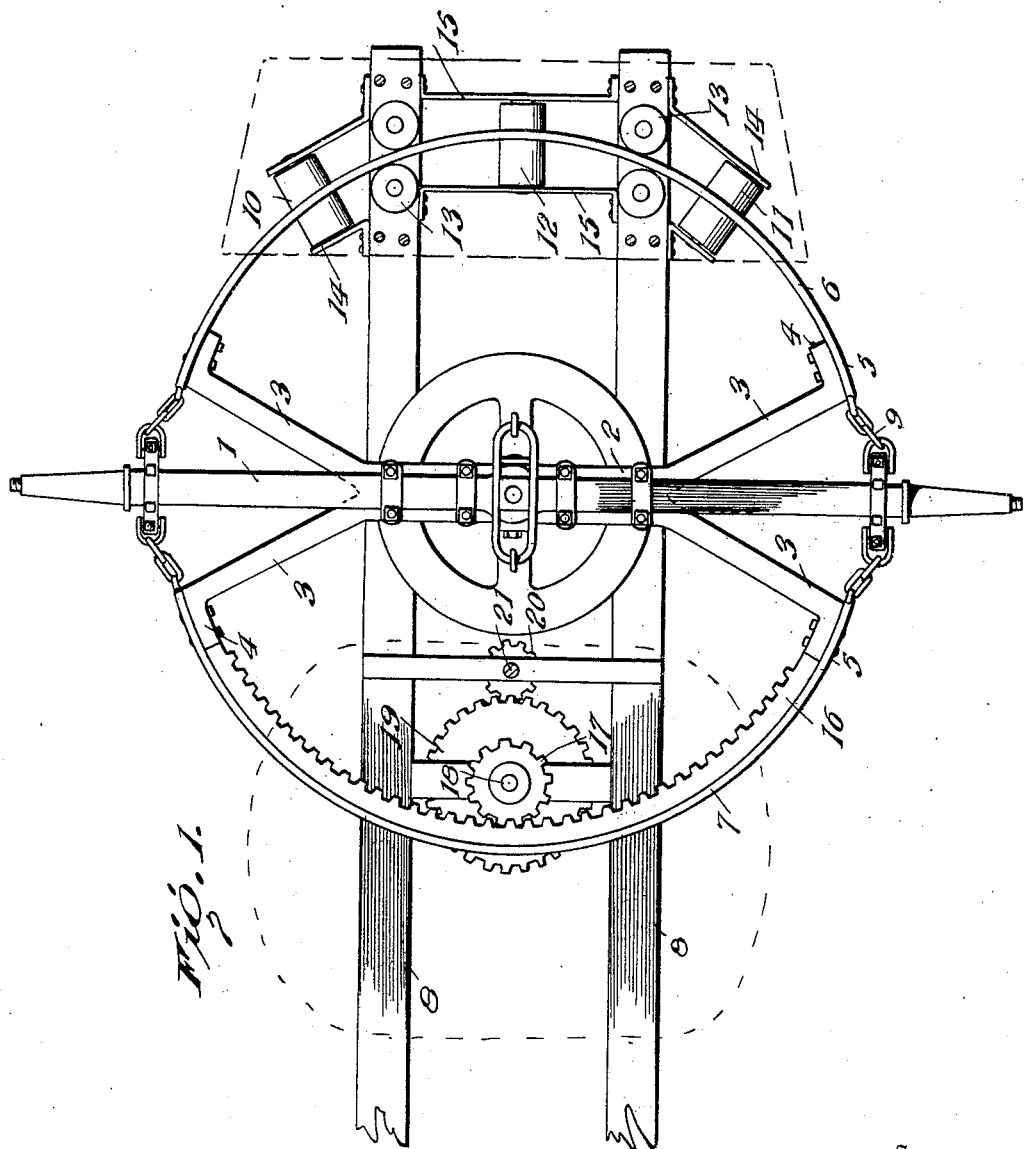
Witnesses
Inventor
A. Mills No. 829,987. PATENTED SEPT. 4, 1906.
A. MILLS.
STEERING GEAR.
APPLICATION FILED OCT. 13, 1905.
2 SHEETS—SHEET 2.
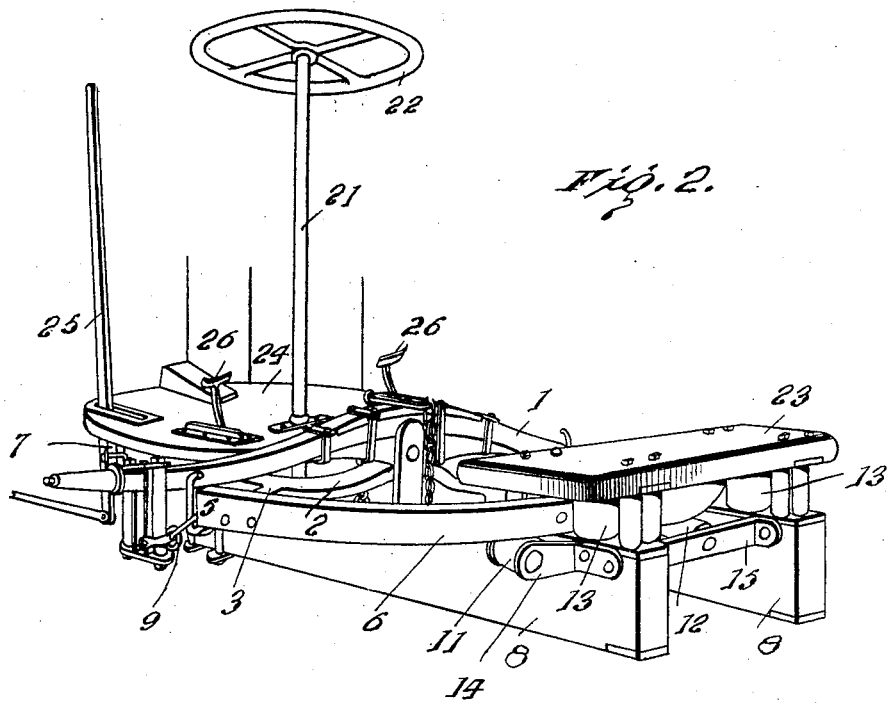
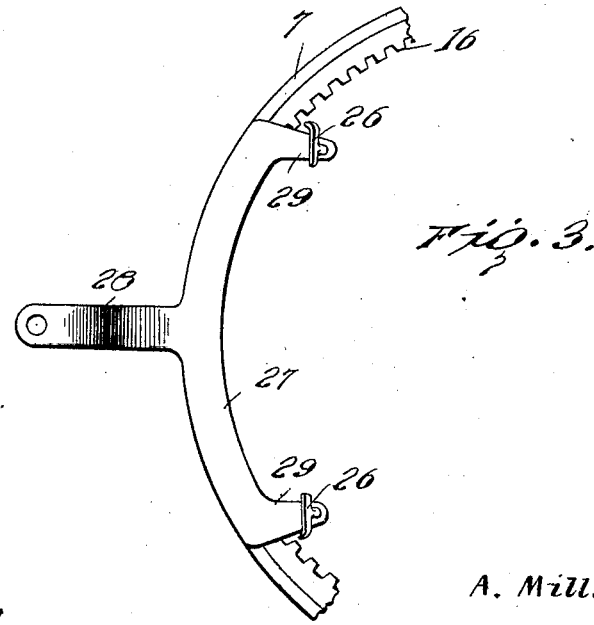
Witnesses
Inventor
A. Mills
By
Attorneys

UNITED STATES PATENT OFFICE.

ARTHUR MILLS, OF AUKUM, CALIFORNIA.

STEERING-GEAR.

No. 829,987.      Specification of Letters Patent.      Patented Sept. 4, 1906.

Application filed October 13, 1905. Serial No. 282,635.

*To all whom it may concern:*

Be it known that I, ARTHUR MILLS, a citizen of the United States, residing at Aukum, in the county of Eldorado and State of California, have invented certain new and useful Improvements in Steering-Gears, of which the following is a specification.

This invention relates to steering mechanism for road-machines, such as traction-engines and other ponderous machines driven by steam, compressed air, gasolene, electric or other type of motor.

An essential feature of the invention is to combine with the axle novel means for sustaining the strain and admitting of said axle being readily turned to properly guide the machine; also, to supply a coöperating brake which may be set at will to prevent the wheels from whipping around on rough ground.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a top plan view of a pivoted axle-steering mechanism embodying the invention coöperating therewith. Fig. 2 is a perspective view of the parts shown in Fig. 1, together with mountings therefor and adjunctive means. Fig. 3 is a detail view of a portion of the toothed segment forming a part of the steering mechanism and the brake member coöperating therewith.

Corresponding and like parts are referred to in the following description and indicated in all the views of the drawings by the same reference characters.

The axle 1 may be of any structural type according to the nature of the machine equipped with the invention. In the present instance the axle 1 is slightly arched and is strengthened by means of a truss-brace 2, whose ends are branched and are outwardly diverged, as shown at 3, the extremities of the diverged members 3 being outwardly flanged at 4 and transversely pierced to receive fastenings 5, by means of which curved bars 6 and 7 are connected thereto. Beams 8 projected forward from the machine or engine are shackled or otherwise fastened to the axle and truss-brace. It is to be understood that the connection must be such as to admit of the axle having a limited turning movement in order to effect proper steering of the machines. The curved bars 6 and 7 are oppositely disposed and form, in effect, a fifth-wheel. A flexible connection 9 is interposed between the respective ends of the curved bars 6 and 7 and hangers fitted to opposite end portions of the axle 1 to cause the fifth-wheel and axle to move together. The flexible connections 9 preferably consist of a series of links and admit of a limited play between the parts, so as to obviate injurious strain. The curved bar 6 rests upon a series of rollers 10, 11, and 12 and passes between pairs of rollers 13. The rollers 10 and 11 are angularly disposed in a horizontal plane and are mounted in brackets 14, secured to the outer sides of the beams 8. The roller 12 is located between the beams 8 and is mounted in irons 15 interposed between the beams 8 and secured at their ends thereto. The pairs of rollers 13 are vertically arranged and are mounted upon the outer ends of the beams 8. The curved bar 7 has an inner flange 16, which is toothed and meshes with a gear-wheel 17, fast to a vertical shaft 18. A corresponding gear-wheel 19, fast with the shaft 18, meshes with a pinion 20, fast to the lower end of the steering-shaft 21, which is provided at its upper end with a hand-wheel 22. The train of gearing interposed between the steering-shaft 21 and the curved bar 7 of the fifth-wheel enables the axle to be turned with comparative ease and held in the required position without causing fatigue or requiring the expenditure of excessive amount of force.

A plate 23 extends over the series of vertical and horizontal guide-rollers to protect the same and serve as a platform. A cover 24 extends over the rear portion of the fifth-wheel to provide a platform and a housing, said platform having openings for the passage of the steering-shaft 21, brake-setting lever 25, and treadle 26.

To hold the axle 1 steady and prevent the wheels whipping about when the machine is traveling over rough ground, it has been found expedient to combine with the fifth-wheel a brake device, the same consisting of a curved bar 27, which is arranged opposite to the curved bar 7, so as to be brought in frictional engagement therewith to effect the desired result. A spring-arm 28 connects the brake member 27 with the platform and normally serves to hold the brake out of action. The treadles 26 have connection with terminal extensions 29 of the brake member and are adapted to receive pressure exerted by the feet of the operator when it is required to hold the axle and wheel steady in the event of rough ground being encountered in the travel of the machine. Within the scope of the invention the precise formation of the brake member and its manner of mounting and coöperation with the fifth-wheel are unimportant so long as the results herein mentioned are attained.

Having thus described the invention, what is claimed as new is—

1. In steering mechanism, the combination of an axle, a fifth-wheel, flexible connections between the fifth-wheel and axle to cause the two to move in unison while admitting of a relative limited play, and means for turning the fifth-wheel to effect a corresponding movement of the axle.

2. In steering mechanism, the combination of an axle, oppositely-disposed curved members having their proximal ends spaced apart, flexible connections between the curved ends of the curved bars and the axle, and means for turning the fifth-wheel consisting of the said curved bars.

3. In steering mechanism, the combination of an axle, a bar extended lengthwise of the axle and connected thereto and having opposite ends branched and diverged, oppositely-disposed curved bars secured at their ends to the extremities of the diverged branches of said bar, connecting means between the respective ends of the curved bars and the axle, and means for turning the fifth-wheel.

4. In steering mechanism, the combination of an axle, a fifth-wheel connected thereto and comprising a curved bar, a series of horizontally and vertically arranged guide-rollers coöperating with said curved bar, and means for turning the fifth-wheel to effect steering of the machine to which the axle and fifth-wheel may be attached.

5. In combination, a loosely-mounted axle, a fifth-wheel connected thereto, means for turning the fifth-wheel to effect corresponding movement of the axle and a steering of the machine equipped therewith, and a brake for coöperating with the fifth-wheel to render the same steady and prevent whipping about of the wheels when the machine is passing over rough ground.

6. In combination, an axle, a fifth-wheel connected thereto and comprising a curved bar provided with teeth, a steering-shaft, a train of gearing between said steering-shaft and the toothed curved bar, and a brake member arranged to coöperate with said toothed bar.

In testimony whereof I affix my signature in presence of two witnesses.

ARTHUR MILLS. [L. S.]

Witnesses:
F. H. THOMS,
HENRY A. MEYERS.